E. C. BALLMAN.
LATHE STOPPING MECHANISM.
APPLICATION FILED NOV. 15, 1918.
1,340,811.
Patented May 18, 1920.
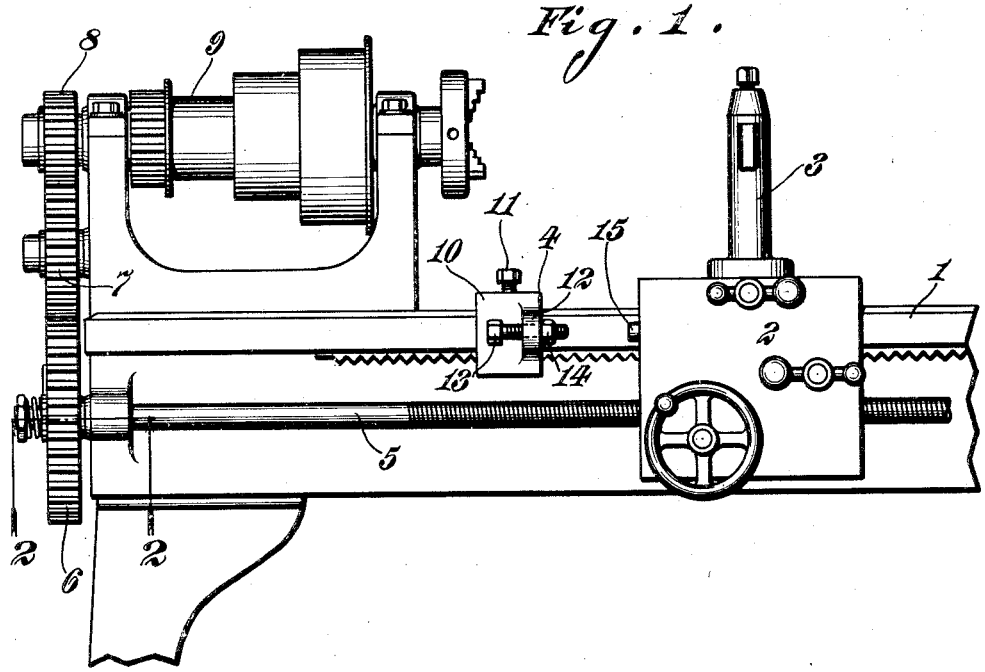
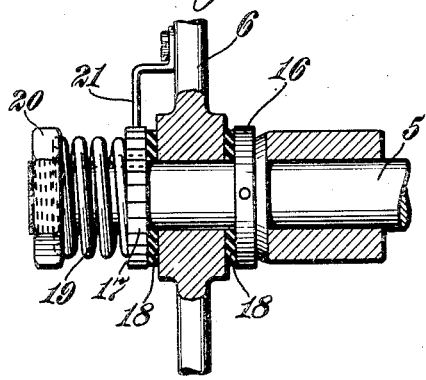
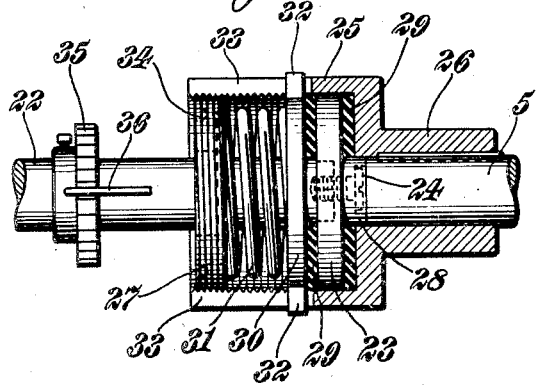
Inventor:
EDWIN C. BALLMAN,
By John W. Bruninga
His Attorney.

UNITED STATES PATENT OFFICE.

EDWIN C. BALLMAN, OF ST. LOUIS, MISSOURI, ASSIGNOR OF ONE-HALF TO STAHL A. WHITTEN, OF ST. LOUIS, MISSOURI.

LATHE-STOPPING MECHANISM.

1,340,811.  Specification of Letters Patent.  Patented May 18, 1920.

Application filed November 15, 1918. Serial No. 262,694.

*To all whom it may concern:*

Be it known that I, EDWIN C. BALLMAN, a citizen of the United States, and residing at St. Louis, Missouri, have invented the new and useful Improvement in Lathe-Stopping Mechanism, of which the following is a specification.

This invention relates to stop mechanisms, and more particularly to stopping mechanism for lathes.

In the operation of a lathe, it is often necessary to produce a number of articles of the same kind, and it is, therefore, of great advantage that a tool and its carriage be moved to a predetermined position and stopped at a predetermined point. In some classes of work, as where a shoulder is turned by a shaft or the like, the carriage must be stopped at an accurately located point during the travel of the same. Consequently, the simple disconnection of the feed mechanism from the carriage will not accomplish this purpose, in view of the fact that there is necessarily varying time intervals between the operation of the disconnecting mechanism and the actual disconnection of the carriage from the feed mechanism and moreover, the inertia of the carriage, even when moving at a slow speed, is sufficient to prevent the stopping of the carriage and its tool with the required accuracy.

One of the objects of this invention, therefore, is to provide mechanism for arresting the movement of the carriage which is constructed and arranged so as to accurately stop the carriage at a predetermined point in its travel.

Further objects will appear from the detailed description, taken in connection with the accompanying drawing, in which:

Figure 1 is a front elevation of a part of a lathe showing the stopping mechanism embodying this invention;

Fig. 2 is a section on the line 2—2, Fig. 1; and,

Fig. 3 is a view similar to Fig. 2, but showing another embodiment of this invention.

Referring to the accompanying drawing, 1 designates a lathe bed, 2 the carriage movable along the lathe bed and carrying a tool post 3, which is movable transversely of the carriage in the usual manner. The carriage is moved by a feed shaft 5 connected by gears 6, 7, and 8 with a lathe spindle 9. The parts so far described may be of any suitable or usual construction, and while the feed shaft 5 is in this connection as shown, it will be understood that it may be the usual plain feed shaft having suitable clutch for connections with the carriage.

Mounted on the lathe bed is a bracket 10 slidable therealong and adapted to be clamped in any suitable position by a set screw 11. This bracket is provided with a lug 12, which is threaded to receive a screw 13, provided with a lock nut 14, and forming a stop in the path of the carriage and adapted to be engaged by a suitable coöperating stop projection 15 on the carriage. As the carriage moves to the left to the action of its feed mechanism, connecting the lathe spindle with the carriage, the carriage moves into engagement with the stop 13 and will be arrested thereby, thus stopping further feed movement of the carriage. It will be understood, of course, that by adjustment of the screw 13 in the bracket 10, the position at which the carriage is stopped in its movement along the lathe bed can be accurately adjusted; while the coarse adjustments can be obtained by the adjustment of the bracket along the lathe bed.

In view of the fact that the carriage is positively adjusted, means are provided for suspending the feed operation of the feeding mechanism when the carriage is stopped. There is, therefore, provided a flexible coupling for the feeding mechanism, one form of which is shown in Fig. 2. For this purpose, the feed shaft 5 has fixed thereto a collar 16 and has loosely mounted thereon a washer 17, while between the collar and the washer and the hub of the gear 6, are a pair of fiber or other antifrictional washers 18. A strong spring 19 is mounted on the end of the shaft 5 and bearing at one end against the washer 17, and at its other end against the nut 20 threaded on the shaft end to hold the antifrictional washer 18 in firm frictional engagement with the hub of the gear 6. There is thus provided a flexible coupling between the gear 6 and the feed shaft 5. The tension of the spring 19 is so adjusted by adjustment of the nut 20 that the yielding connection will not yield during the normal cutting operation by the tool, while the carriage is running along the lathe bed. When, however, the carriage is arrested by the stop as heretofore described, the coupling will yield so that while the feed shaft 5 remains stationary, the gear 6 will retain the feed shaft thereby suspending the operation of the feed mechanism when the carriage is stopped. In order to notify the workman and in order to prevent undue wear of the yielding coupling, the washer 17 is provided with fine teeth engaged by a finger 21 on the gear 6. This will furnish an audible signal as the finger snaps over the teeth.

Fig. 3 shows another embodiment of this invention. In accordance with this invention, the feed shaft 5 is divided at a point to the right of the bearing supporting the feed shaft, shown in Fig. 1, and the section is connected with the gear 6 in the usual fixed relation, or with the usual cone pulley, where the feed shaft is operated by a belt and pulley from the lathe spindle. In this construction, the shaft section 22 has fixed thereto a collar 23 which is secured by a screw 24, and this collar is arranged in a coupling head 25 having a hub 26 splined to the end of the feed shaft 5. In order to secure a firm bearing, the shaft section 22 passes through and has a bearing in a threaded collar 27, and engaging the internally threaded coupling head, while the hub 28 of the collar 23 extends into and has a bearing in the hub 26. Arranged on opposite sides of the collar 23 are a pair of antifrictional washers 29 against one of which bears a washer 30 engaged by a strong spring 31, bearing at one end against the threaded collar 27. In order to keep the washer 30 from rotating, the washer is provided with projections 32 engaging slots 33 in the coupling head. The collar 27 may be provided with any suitable recesses 34 adapted to be engaged by a wrench in order to adjust the tension of the spring 31. The shaft section 22 may be provided with a toothed collar 35 engaged by a yielding finger 36 fixed to the coupling head 25 so as to provide an audible signal. The operation of this yielding coupling will be understood as its function and operation are the same as that shown in Fig. 2.

It will, therefore, be seen that the invention accomplishes its objects. The provision of a positive stop in the path of travel of the carriage operates to positively arrest or stop the feed movement of the carriage, when the carriage reaches the predetermined point in its travel. The carriage can, therefore, be stopped with great accurateness, and a shoulder can, therefore, be turned at a predetermined point on the shaft.

It is obvious that various changes may be made in the details of construction without departing from the spirit of this invention; it is to be understood that this invention is not to be limited to the specific construction shown and described.

Having thus described the invention, what is claimed is:

1. In a lathe having a bed, a carriage movable therealong, driving mechanism, a feed shaft connected to automatically feed the carriage along the bed, characterized by the provision of a stop on the bed adapted to positively arrest the carriage, and a yielding coupling between the feed shaft and the driving mechanism adapted to suspend the operation of the shaft when the carriage is stopped.

2. In a lathe having a carriage and feed mechanism therefor, the employment of mechanism for arresting the movement of said carriage, comprising, means for positively stopping said carriage, a yielding coupling for said feed mechanism adapted to suspend the operation thereof when the carriage is stopped, and means operating audibly when the carriage is stopped.

In testimony whereof I affix my signature this 7th day of May, 1918.

EDWIN C. BALLMAN.